3,798,319
THERAPEUTIC AND DIAGNOSTIC ALLERGENIC EXTRACT AND PROCESS FOR PREPARING SAME
Kermit Maynard Espey, Elkhart, Ind., and John Joseph Gavin, Hamden, Conn., assignors to Miles Laboratories, Inc., Elkhart, Ind.
No Drawing. Filed June 4, 1968, Ser. No. 734,235
Int. Cl. A61k 23/00
U.S. Cl. 424—91                                    1 Claim

ABSTRACT OF THE DISCLOSURE

A process for preparing therapeutic and diagnostic antigenic or allergenic extracts comprising extracting and treating substances known to contain physiologically active principles which elicit allergenic responses with an aqueous-organic solvent extracting fluid, separating the extracting fluid containing the active principles from the insoluble material therein and then volatilizing and removing the extracting fluid to thereby isolate said active principles in the form of a dry powder. The dry powder may then be further processed to provide an allergenic extract in a selected one of various forms known in the art of therapeutic and diagnostic immunology.

Background of the invention

It has long been known that various individuals upon contacting, and particularly inhaling, certain naturally occurring and synthetic organic particles or substances develop characteristic allergic reactions such as sneezing, activation of mucus glands, local edema, skin eruptions and vasodilation. These reactions are commonly called "hay fever" and even though the reaction in itself is not usually serious, it may lead to complications, both physiologically and psychologically. In a small child the constant presence of an allergic condition often causes permanent deformities in the body and particularly the facial structure not to mention the psychological effects of an ever present discomfort. Asthmatic conditions are also intimately connected with allergic reactions and may also cause more serious complications. Medical science now recognizes the hay fever malady as a serious condition which must be treated with care and thoroughness.

In this regard, it has likewise been known for some time that extracts of the above noted allergenically or antigenically active substances, when injected subcutaneously, alleviate these allergic reactions. The exact physiological mechanism of this treatment, known in the art as hyposensitization, has not yet been completely and satisfactorily explained. Various theories however have been brought forward which attempt an explanation. One such theory assumes the formation of so-called blocking or neutralizing antibodies caused by injecting the extract, while another theory postulates that such treatment encourages the formation of union between antigen (or allergen) and antibody in the free circulation rather than in the shock tissue.

Description of the prior art

In the preparation of such allergenic extracts, it has been common practice in the past to simply extract the offending organic substance causing the allergic reaction with a physiologically acceptable aqueous extracting fluid such as a saline solution or a slightly alkaline saline solution. After separating the extraction fluid from the residue, this solution containing the active principles is sterilized and simply used as such, after, of course, making the proper serial dilution thereof. In such an extraction procedure the physiologically acceptable extracting fluid is selected and designed to protect the structural integrity of the antigenic molecule.

Recently, however, a method has been devised which results in a more complete and effective allergenic extract. This process is described in U.S. Pats. Nos. 3,148,121 and 3,148,122 and briefly comprises treating a whole undefatted allergenic substance with an aqueous heterocyclic tertiary amine extracting fluid, separating the liquid phase containing the active principles from the residue, discarding the residue and, in order to remove the heterocyclic tertiary amine from the active principles, adding water and an alum solution to the extract to precipitate the active principles therefrom. The precipitate is then washed several times with water to remove all of the heterocyclic tertiary amine and excess alum and is finally resuspended in a physiologically acceptable vehicle such as, for example, a phosphate buffer solution.

Initially, it was believed that the inclusion of the heterocyclic tertiary amine in the process merely resulted in a more complete allergenic extract, since the amine soluble constituents were included in the extract as well as the water-soluble proteinaceous and carbohydrate fractions. Now, however, it is believed that the reactive chemical nature of the heterocyclic tertiary amine may cause a structural modification of the antigenic molecule which results in an allergenic treatment extract which is effective and relatively free from constitutional side reactions.

As effective and advantageous as these heterocyclic tertiary amine extracted-alum precipitated allergenic extracts (hereinafter called PEAP extracts, since pyridine is the preferable heterocyclic tertiary amine used in such a process) have been found to be, several limitations have appeared over the years. In this regard it was found that this type of extract could not be used for skin testing purposes, a situation clinical allergists usually wish to avoid, since they prefer to use the same extract for both diagnosis and treatment. Such a procedure using the same extract insures that the treatment involves the exact antigen found to be the cause of the allergic skin reaction. The above limitation of PEAP extracts is believed to be due to the insolubility of the precipitate and/or the formation of a complex between the heterocyclic tertiary amine-extracted antigen and the alum used in the precipitation of the antigen from the extracting fluid.

Moreover, the process parameters for preparing PEAP antigens using the prior art methods are rather lengthy, and the yield leaves much to be desired, i.e., in the range of about 50% of the PNU's (protein nitrogen units) originally extracted.

Objects of the present invention

It is therefore an object of the present invention to provide a more versatile and effective allergenic extract than that produced by prior art aqueous and PEAP methods.

It is another object to provide an improved process for preparing allergenic testing extracts and long acting treatment extracts using a common antigenic extracting procedure.

It is still an other object to provide an aqueous organic solvent extracting procedure whereby substantially all antigenic material is recovered in the processing thereof.

SUMMARY OF THE INVENTION

These and other objects which will become apparent from the following description and the claims appended thereto are achieved (1) extracting the allergenically active substance with an extracting fluid comprising a mixture of an aqueous phase and an organic solvent, whereby the active principles are dissolved in and treated with the said extracting fluid, leaving a residue of inactive insoluble materials, (2) separating the liquid phase comprising the extracting fluid and the active principles from the insoluble residue, and (3) separating the active principles from the extracting fluid by a volatilization technique leaving a stable, substantially dry allergenically active powder extract.

Description of the preferred embodiments

At this time it should be recalled that the prior art PEAP process utilized the alum-precipitation step as an integral part of the allergenic extract preparation process, since only by including this step in the process could the active principles be separated from the physiologically undesirable heterocyclic tertiary amine extracting fluid.

It has now unexpectedly been found that this step, i.e., the precipitation of the antigen from the aqueous- heterocyclic tertiary amine by the use of alum, which was considered essential in the prior art PEAP process, can be eliminated entirely by the expedient of separating the active principles from the extracting fluid by a volatilization technique prior to reducing the said active principles to the final dosage form. The volatilization step will be described hereinafter.

The process according to the present invention is applicable to all allergenically active substances both of natural origin and synthetically prepared. Such substances include dusts, as ordinary dust found in homes and collected in vacuum sweepers and dust found in manufacturing facilities, such as sawdust; epithelials, such as cat, dog, horse and rabbit dander; feathers, such as from geese and chickens; seeds, such as cottonseed and Kapok; insects and emanations from insects, such as bees, hornets, and mosquitos; pollens from trees, grasses and weeds, such as ragweed, orchard grass, maple trees, poplar trees; molds, such as *Aspergillus niger* and Alternaria; complex synthetic chemicals, such as antibiotics, and the like.

Referring now to the extracting fluid used to initially solubilize, treat and remove the active principles or allergenically active substances from the inactive residue which is discarded, it has been found that the preferable fluid for use in the present invention comprises a mixture of an aqueous phase and an organic solvent phase. The latter constituent of the extracting fluid may comprise a basic nitrogen containing solvent having a boiling point sufficiently low to permit volatilization thereof without destroying the structural integrity of the treated allergen. This boiling point limitation will be more fully discussed hereafter when the volatilization step is more completely described, but generally speaking the organic solvent should have a boiling point of less than about 120° C. except when a volatilization technique such as spray drying is employed in which the allergen is only momentarily exposed to a higher temperature. Preferably the organic solvent portion of the extracting fluid comprises an amine, and more preferably a heterocyclic tertiary amine such as for example, pyridine, pyridine derivatives such as lutidine, quinoline, collidine, picoline and the like. In addition to the boiling point requirement for this organic solvent, it preferably is also miscible with water.

Although the exact chemical effect of the organic solvent on the antigen molecule or structure thereof is not known with any degree of certainty, it is believed that the highly polar or basic nature of the above-noted solvents cause them to react with the antigen to form a compound therewith, or somehow alter the complex molecular structure of the protein, carbohydrate, lipoprotein or polypeptide which forms the basis for the allergenic nature of the offending substance.

The second constituent of the extracting fluid, that is, the aqueous phase, may comprise plain distilled water or, preferably, a saline and/or alkaline, aqueous solution. In this regard, sodium bicarbonate, sodium chloride, sodium hydroxide, phosphate buffers and the like may be employed. When substances having an alkaline nature such as a heterocyclic tertiary amine are used in the extracting fluid, this second aqueous constituent may also consist of a buffer which adjusts the pH to a more neutral value. The resulting pH of the final extracting fluid prepared by mixing the amine organic solvent phase and the aqueous phase, may be from about pH 7.5 to pH 12.0 and preferably is set in a more narrow pH range of from about pH 9.0 to pH 12.0 Since a wide variety of allergenic substances have been found adaptable to the present process, the pH of the extracting fluid and the composition theerof may be varied considerably. For example, ragweed pollen is known to contain a high and toxic fat or lipid content which has been suggested to contribute heavily to the allergenic nature of this substance. In extracting this weed pollen one may wish to increase the ratio of organic solvent phase to aqueous phase to insure solubility of all the lipid material. However, about equal parts of organic solvent phase and aqueous phase have been found to result in an extracting fluid having broad applicability.

The extracting process usually comprises mixing the offending allergenic substance, after physical removal of contaminating foreign constituents, with the extracting fluid and allowing the mixture to remain at a temperature of about from 20° C. to 25° C. for up to about 11 days either with or without agitation. The residue is then separated from the liquid phase which at this time contains the treated and solubilized active allergenic principles, by allowing the insoluble residue to settle out, centrifuging the mixture or a filtration process such as vacuum filtration. The residue is then discarded and the resulting liquid phase is a clear, often slightly amber or greenish colored solution of the reaction product of the organic solvent-aqueous extracting fluid and the antigen.

At this stage the present invention clearly departs from the prior art PEAP process in which potassium aluminum sulfate (alum) is then added to precipitate and remove the antigenic or active allergenic principles from the physiologically unacceptable extracting fluid. The deviation of the process of the present invention from the prior art PEAP process comprises the separation of the active principles from the extracting fluid by a volatilization process, that is, the liquid phase is subjected to a physical condition which causes the liquid phase to be transformed to a gaseous phase and the non-volatile active principles are separated by diffusing or removing the gaseous phase from the said active principles.

This important volatilization step of the present inventive process may comprise any of the known methods of separating a solvent system from a substance dissolved therein. Such methods include, inter alia, freeze drying, spray drying, vacuum drying, the use of rotating vacuum drying apparatus and the like. The temperatures employed in this drying step may be from a minimum required to volatilize the extracting fluid at the pressure used, up to about 85° C.; the latter being the temperature used in a spray drying procedure where the thermo labile antigen is only momentarily subjected to such an extreme temperature. The pressure employed in the volatilization system likewise depends upon the specific procedure used and may vary from atmospheric pressure or slightly thereabove down to about 30 mm. of mercury such as would be employed in a freeze drying technique.

It has also been found that in order to remove the last vestiges of the aqueous-organic solvent extracting fluid, it is preferable to allow the substantially dry particulate antigen resulting from the volatilization step to remain in a vacuum desiccator for about 24 hours. This step may be accomplished at room temperature or up to about 45° C.

The result of the above procedure is a dry, particulate allergenically or antigenically active substance which has been treated with the highly reactive extracting fluid, contains substantially all of the active principles from the original offending substance and, as will be seen hereinafter is an extremely versatile antigenic extract from the standpoint of ultimate use. It will also be appreciated that practically no allergenically active material has been lost by such process, whereas in the prior art process of alum precipitation from an aqueous-organic solvent extract, a substantial portion of the protein nitrogen initially extracted is lost. Thus the yield and completeness of extraction are dramatically increased by such an expedient.

It should also be noted at this time that the present process is by no means restricted to a complex, naturally occurring mixture of antigens but may be applied to an extract which has been subjected to a procedure whereby the various antigen fractions are separated prior to the treatment and/or volatilization step.

At this stage the dry particulate (powder) extract may be further processed to provide an allergenic extract in a selected one of various forms known in the art of using allergenic extracts. Thus, the powder may simply be reconstituted with a physiologically acceptable aqueous solvent system and used as both a diagnostic skin testing extract and a hyposensitization treatment extract. Such physiologically acceptable fluids include buffered saline or Evan's solution, Coca's solution comprising sodium bicarbonate, sodium chloride and phenol, glycerosaline or Stier's solution, dextrose or Ungar's solution, phosphate buffered solutions, and the like. These solutions usually have a pH of around 7 and may be as high as pH 7.5.

A second method of further processing the dry powder extract may comprise the reconstitution thereof with an aqueous solution and the subsequent addition of an aluminum compound such as potassium alum or aluminum hydroxide to insolubilize the antigen and prepare a therapeutic dosage form having slow release properties. In this regard it has unexpectedly been found that the insolubilized precipitate or adsorption product using the aqueous reconstituted organic solvent treated extract of the present invention is quite superior to prior art alum pecipitated antigens from defatted strictly aqueous extracted solutions thereof. Whereas such prior art preparations are gelatinous in nature and pharmaceutically unacceptable, the present preparations are particulate, homogeneous suspensions and are pharmaceutically elegant in appearance.

It should be noted here that it has also unexpectedly been found that the yield of precipitate from the reconstituted extract using an aluminum compound to insolubilize the antigen, is dramatically greater than that obtained by using the prior art PEAP process. For example, yields of about 40–50% are achieved by using the prior art PEAP process whereas in the present process about 80–90% yield is obtained. This yield is calculated on the basis of protein nitrogen in the extracting fluid as compared to protein nitrogen in the insolubilized precipitate or adsorption product.

In this insolubilizing procedure, a stoichiometric amount of aluminum may be added and the suspension simply extended out to the proper potency with additional aqueous fluid; or excess aluminum compound added and the precipitate or adsorption product removed from the supernatant, washed and resuspended in a physiologically acceptable aqueous fluid.

In order to insure that the allergenic extract is sterile, it is the usual practice to pass a solution containing the thermolabile antigen extract through a bacterial filter, more commonly called a Seitz, micropore, millipore® or membrane filter. Such procedures are well known in the art and are described in various texts relating thereto. In the present invention such sterilization may be accomplished in any liquid phase so long as the antigen is in solution. For example, either the initial aqueous-organic solvent extract or the aqueous reconstituted extract may be sterilized by filtration. Of course it will be appreciated that a spray drying technique may effect a sterilization of the resulting dry product and make such a bacterial filtration step unnecessary.

Referring now to the mode of use of the present preparation, such techniques are also well known in the art and may be broken down into two categories, i.e. (1) skin testing or diagnostic extracts and (2) treatment or therapeutic extracts. The testing or diagnostic extracts are primarily aqueous in nature and are used by placing a drop of the specific extract on the skin of the individual or animal being tested and abrading the surface of the skin under the extract. If after a rather short period of time an eruption or wheal appears, it is strongly indicated that the individual is allergic to the particular antigen used in the test. Another testing method comprises the intracutaneous injection of the extract and a subsequent observation of wheal formation. Conjunctival, sniff and inhalation tests may also be used with the dry powder resulting from the initial extraction and these are said to be more revealing and precise than skin testing.

The second category of extracts, the treatment or therapeutic extracts, may comprise the aqueous, aluminum precipitated, repository and similar extracts. The use of such treatment extracts comprises the subcutaneous injection of an extremely dilute solution of the antigen followed by subsequent daily or weekly injections of gradually increasing concentration. Because of the extremely wide range of sensitivities of various individuals and the different release characteristics of the various therapeutic forms of the antigen, a regime of treatment is decided upon by the clinician on an individual basis.

In regard to dosage or potency of extract, the products of the present invention may be concentrated or diluted according to the basic strength of the initial extract and the desired potency of the final extract. The most common, although not entirely satisfactory means for standardizing the extract, is the analysis of the solution for PNU or protein nitrogen units. The deficiency of this method obviously is that all the antigenic fractions of the extract are not necessarily proteinaceous but may be carbohydrate, lipid or other non-nitrogenous molecules. In regard to potency of extract the usual practice is to standardize treatment extracts to from about 10 to about 5,000 PNU depending on the correlation between antigenicity and protein nitrogen. Treatment extracts are usually set at from about 10 PNU to about 20,000 PNU, the lower potency extracts being used in the initial phases of the hyposensitization therapy and the higher potency extracts as a sustaining or maintenance dose at greater time intervals.

The present invention is illustrated by the following examples but there is no intention to limit the scope of the present process or product thereto.

EXAMPLE 1

Preparation of dry powder extract

An extracting fluid comprising a mixture of 250 ml. pyridine and 250 ml. 0.1 N sodium hydroxide was prepared and 50 grams of a mixture of high and low ragweed pollen added thereto. The mixture was allowed to stand for 5 days at room temperature with occasional agitation. The clear supernatant liquid phase containing the active principles from the ragweed pollen was decanted and the residue discarded.

The supernatant was then placed in a rotary vacuum evaporator (flash evaporator) equipped with a condensing unit and heated to 50° C. until the liquid phase had been removed. The result was a substantially dry brownish powder. The powder was then placed in a vacuum dessicator and allowed to remain therein under a vacuum overnight. The result was a free flowing powder having no traces of solvent.

EXAMPLE 2

Preparation of a diagnostic extract

A solution of ragweed pollen antigen containing 10,000 PNU/ml. was prepared by adding 393.2 mg. of the dried powder prepared in Example 1 to 100 ml. of distilled water at 50° C. The pH of the resulting solution was 7.4.

The solution was then passed through a millipore filter to effect sterility. The filtrate was analyzed and found to contain 9,100 PNU/ml. of ragweed antigen.

The above solution was then diluted with distilled water under sterile conditions to 1000 PNU/ml. and intradermal (intracutaneous) tests were made on four individuals known to be clinically sensitive to ragweed pollen. A second solution of 5000 PNU/ml. was prepared and intradermal tests were made therewith on two individuals known to be normal and non allergic in respect to ragweed pollen. The results are indicated below in Table 1. In this table patients 1–4 were known to be sensitive to ragweed pollen while patients 5–6 were known to be non-sensitive to such pollens.

TABLE 1

| | Sensitivity [1] to— | |
|---|---|---|
| | 1,000 PNU/ml. | 5,000 PNU/ml. |
| Patient: | | |
| 1 | 2+ | |
| 2 | 2+ | |
| 3 | 3+ | |
| 4 | 2+ | |
| 5 | | 0 |
| 6 | | 0 |

[1] See the following:
 0=Negative reaction—no wheal.
 1+=Slight reaction—5 mm. wheal with erythema.
 2+=Moderate reaction—10 mm. wheal with erythema.
 3+=Marked reaction—15 mm. wheal with erythema and possible pseudopodia and itching.
 4+=Marked reaction—20 mm. wheal with erythema, pseudopodia, itching and pain.

EXAMPLE 3

The procedure of Example 1 was followed in preparing a dry powder extract of ragweed pollen. When reconstituted with distilled water under sterile conditions and diluted to the potency required, this extract is useful in hyposensitization therapy for individuals allegic to ragweed pollen or for the diagnosis of allergies by skin tests.

EXAMPLES 4–9

Examples 1–3 were repeated except that housedust, horse dander, chicken feathers, stinging insects, timothy grass and birch tree pollen were substituted for ragweed pollen. Such extracts are used for diagnosis of allergic reactions by skin testing or for hyposensitization therapy. The dry powders are also useful for the diagnosis of allergic reactions by conjunctival or sniff test methods.

EXAMPLE 10

To about 100 ml. of the reconstituted extract of Example 3 adjusted to a pH of about 6.2 with dilute sulfuric acid, about 50 ml. of a sterile 2% by weight solution of potassium aluminum sulfate was slowly added with continuous agitation. The precipitate obtained was separated from the supernatant liquid by centrifuging, washed with distilled saline solution and resuspended in phosphate buffer having a pH of about 7.0. The yield obtained was about 80%. This allergenically active suspension is useful as a slow release hyposensitization treatment extract.

What is claimed is:

1. In a process for preparing a long acting treatment extract of an inhalant substance selected from the group consisting of pollens, dusts, epithelium, molds, insect materials, seeds and feathers capable of eliciting an allergenic response and containing physiologically active principles, which process includes mixing the substance with an extracting quantity of a fluid comprising water and a heterocyclic tertiary amine selected from the group consisting of pyridine, quinoline, lutidine, collidine and picoline, separating the fluid from any insoluble material therein and discarding the insoluble material, the improvement which comprises volatilizing the fluid to isolate the active principles as a dry powder, reconstituting the extract with an aqueous solvent, adding an aluminum compound selected from the group consisting of potassium alum and aluminum hydroxide to the aqueous reconstituted extract, and isolating and resuspending the insolubilized active principles in a physiologically acceptable aqueous fluid.

References Cited

UNITED STATES PATENTS

| 2,150,131 | 3/1939 | Rockwell | 424—91 |
| 3,148,121 | 9/1964 | Strauss | 424—91 |
| 3,148,122 | 9/1964 | Strauss | 424—91 |

FOREIGN PATENTS

| 1,082,159 | 9/1967 | Great Britain | 424—91 |

OTHER REFERENCES

Remington's Pharmaceutical Sciences, Mack Pub. Co., Easton, Pa. (1965), pp. 359–360.

ALBERT T. MEYERS, Primary Examiner

F. E. WADDELL, Assistant Examiner

U.S. Cl. X.R.

424—88